Aug. 14, 1951     J. E. L. LEPERRE     2,564,163
RECEPTACLE WITH ELASTIC BAG INSERT AND SYSTEM
FOR FILLING AND EMPTYING THE SAME
Filed June 11, 1946     2 Sheets-Sheet 1
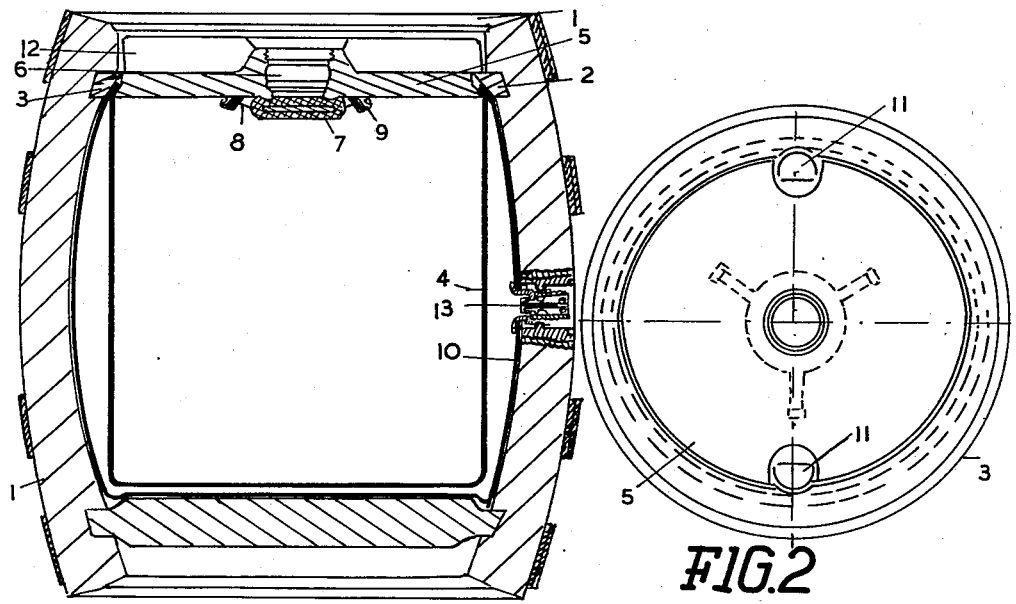
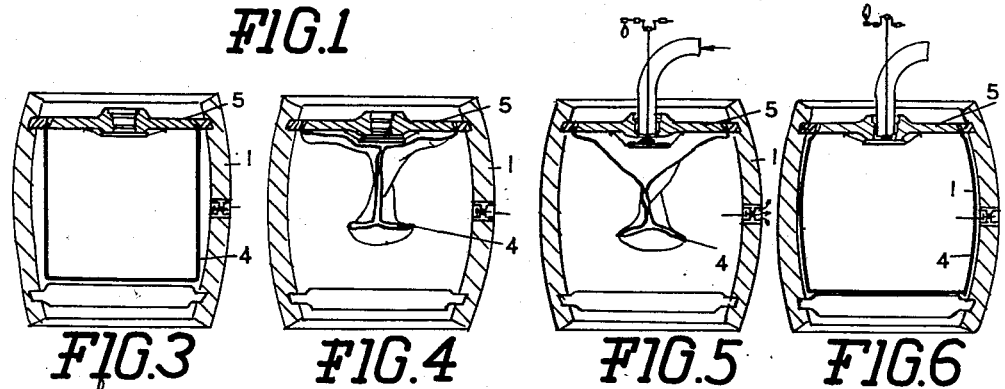
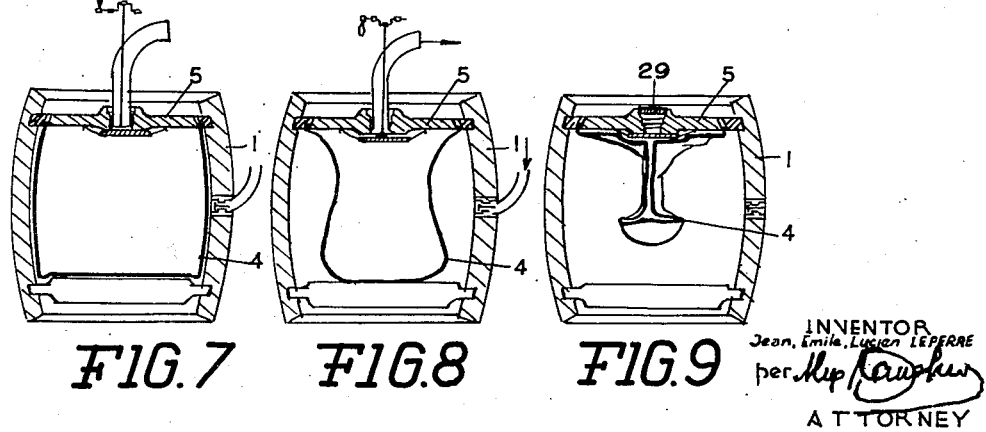
INVENTOR
Jean. Emile. Lucien LEPERRE
per
ATTORNEY

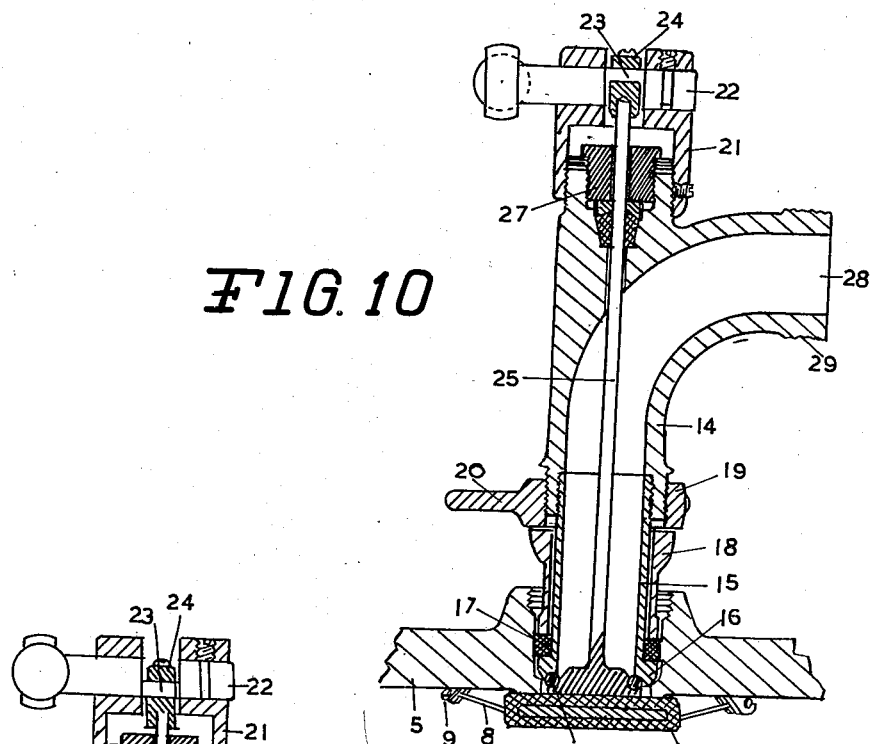
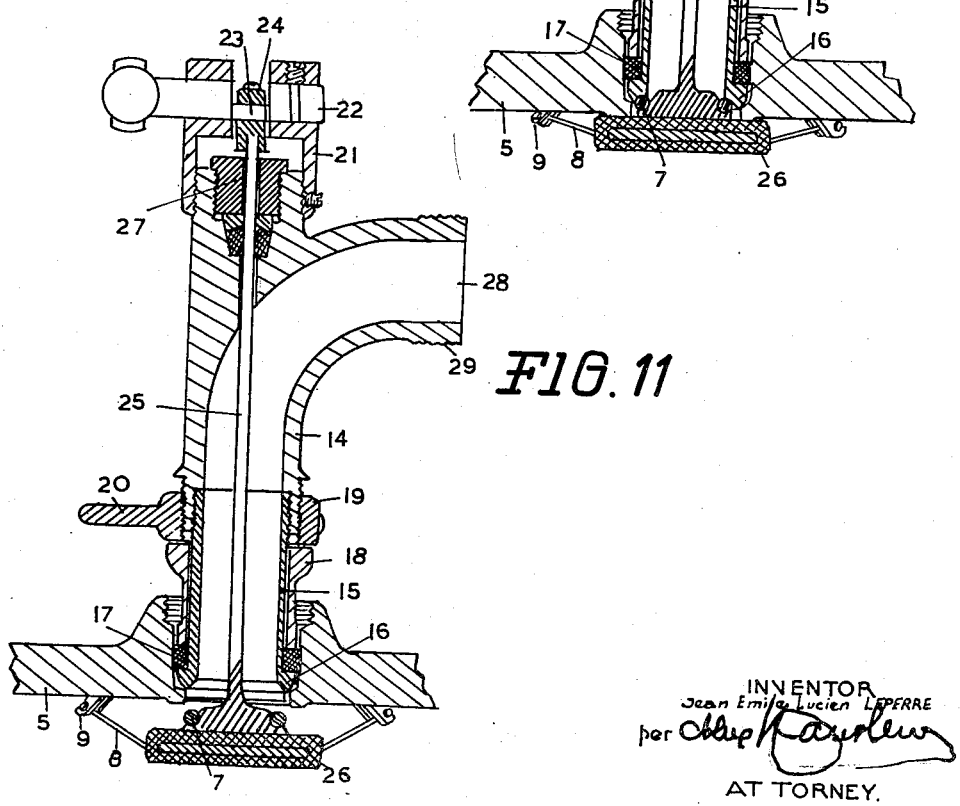

Patented Aug. 14, 1951

2,564,163

UNITED STATES PATENT OFFICE 2,564,163

RECEPTACLE WITH ELASTIC BAG INSERT AND SYSTEM FOR FILLING AND EMPTYING THE SAME

Jean Emile Lucien Leperre, Edegem, Belgium

Application June 11, 1946, Serial No. 675,996
In Belgium January 12, 1943

Section 1, Public Law 690, August 8, 1946
Patent expires January 12, 1963

10 Claims. (Cl. 226—20)

1

The present invention relates to a method and means for preventing the infection of beer and the like liquids between their casking and their dealing out in the cafés. More particularly, it deals with a special receiver and its filling without any introduction of air, formation of froth, or contaminated by any possible infection in the casks.

It is a known fact that beer and chiefly low fermenting beer is very delicate to handle and is very easily contaminated in the handling to which it is submitted between the brewery and the consumer. Numerous laboratory experiments have shown that beer samples removed with all the required care directly from the brewery tanks keep well. The case is no longer the same when the beer has passed through different casks and various drawing off means.

The different causes of contamination are as follows:

In the case of wooden casks, these casks are always infected by the beer dregs remaining inside the casks emptied at the retailers. Once the cask is contaminated it is not possible to sterilize it again completely and the infection is continued by each new filling with beer.

Laboratory experiments of a very complete character have shown that when it is possible to superficially sterilize a cask, the infection begins again as soon as the cask has been put again under pressure.

It is a well-known fact that the dissolution of air in beer is also a cause of the lack of stability of said beer.

Moreover, the beer containers of the drawing off means where the beer has always a tendency to become hot, and to lose a part of its carbonic gas, the return into said containers of the froth and of the counterpressure gases, as well as the presence of the plunging tubes of the drawing off means, are several of the factors causing alteration of the beer.

As to the dealing out of the beer, it is a known fact that as long as a cask is not broken into, the beer retains generally its quality but once it has begun being dealt out the beer loses in a few hours most of its quality.

On the other hand for breaking into his cask, the retailer introduces into his beer a plunging tube which has generally been left about in the cellar and at the same time he drives into it the stopper of the cask which is unavoidably contaminated.

The present invention has for its object to remove these multiple drawbacks, and it comprises

2 chiefly a special container having a yielding receiver mounted inside a rigid receiver with means being provided for allowing the liquid under pressure to enter inside the inner yielding receiver and also for allowing a counter-pressure fluid to be introduced between this inner yielding receiver and the outer rigid receiver.

A further characteristic feature of the invention consists in that the recess formed by the inner yielding receiver is reduced to zero for the filling of the cask with beer under pressure so that said recess is consequently completely emptied of its air, this being produced by a counter-pressure exerted between said receiver and the rigid outer receiver, the former increasing gradually in volume through the introduction of beer under pressure inside it while said counterpressure gas progressively escapes from the outside of the yielding receiver.

According to a still further feature of the invention, there is provided a rigid receiver containing a yielding removable fluid-tight receiver, pouch or pocket into which the liquid under pressure is introduced while means are provided firstly for allowing the latter to communicate with the outside and secondly for adjusting the pressure of the fluid contained between the two receivers.

Further characteristic features will be described in the following specification:

In the accompanying drawings there is illustrated by way of example a form of execution of the present invention.

Fig. 1 is a cross sectional view of the cask according to the present invention.

Fig. 2 is a plan view of the removable cover of the cask inside a ring shaped member with an elliptic opening.

Fig. 3 shows at a reduced scale a cross-section of the cask.

Fig. 4 is a cross-sectional view of the cask wherein pressure is established on the outside of the elastic pocket.

Fig. 5 is a cross-section of the cask during the filling operation.

Fig. 6 illustrates cross-sectionally a cask filled with liquid.

Fig. 7 is a cross-sectional view of a cask ready to be emptied, while

Fig. 8 is a view thereof during its emptying, and

Fig. 9 shows the emptied cask.

Fig. 10 is a cross-sectional view of a special cock fitted on the bung-hole.

Fig. 11 is a cross-section of said cock in its open position with the clack or check valve spaced with reference to the cover.

According to the form of execution of the method and of the means illustrated in the drawings, the rigid receiver 1 is an ordinary cask in the upper cross grooves 2 of which is keyed a ring-shaped member 3 and said ring-shaped member is provided with an elliptic opening executed in a manner such that it may be tightened over the edge of a yielding receiver 4 forming a pocket when the suitably shaped cover 5 is laid so as to be inserted inside the opening of the ring-shaped member 3 and to form thus an autoclave closure.

At the center of the cover 5 is provided a bung-hole 6 closed on its inner side by a clack or check valve 7, of reinforced rubber for instance, said valve being held by the elastic strips 8 secured on the other hand to hooks 9 rigid with said cover 5.

At the same time and with the flexible receiver or pocket 4, there may be held fast between the cover 5 and the ring 3 the edge of a membrane 10 adapted to provide for the fluid-tightness of the cask. Obviously this membrane 10 is not indispensable and the desired fluid-tightness may also be obtained through other means already known per se. The edges of the pocket 4 and those of the membrane 10 serve also as a packing between the ring 3 and the cover 5.

On the cover 5 are provided cotters 11 adapted to hold said cover 5 inside the ring 3 while the cover and the ring may be covered by a heat insulating packing 12 adapted simultaneously for the damping of the shocks to which the cover 5 may be submitted during transportation for instance.

The rigid casing 1 of the cask is provided with a valve 13 which valve may be hand actuated for instance, for the introduction of the gasiform fluid which is to exert the necessary required pressure between the rigid cask and the yielding pocket for exhausting the air out of said pocket before its filling with beer or the like and then for the escape of the counter pressure used for the progressive filling of the pocket with the liquid and finally for obtaining pressure for dealing out the liquid. For the exhaust of the gas, said valve may be hand actuated.

The bung-hole 6 or central opening is shaped in a manner such as will allow the mounting and fastening of a cock or small sluice (Figs. 10 and 11) comprising chiefly a body 14 extending at its lower part in the form of a pipe 15 with a flange 16. Immediately above the flange 16 of the pipe 15 is arranged a rubber ring 17 submitted to the action of the sleeve 18 controlled by a nut 19, provided with a hand lever 20 and adapted to be screwed over the body 14 of the small sluice, the rubber ring 17 being thus compressed and holding the cock inside the upper cover 5 of the cask.

The cock body carries a cap 21 serving as a support for the spindle 22 provided with an eccentric trunnion 23. On said eccentric trunnion 23 is mounted the bushing 24 of the valve 25 carrying an elastic torus 26 adapted to provide for the fluidtightness of said valve on its seat.

The valve is rendered fluidtight on the side facing the cap by means of a stuffing box 27 while the channel 28 admitting the liquid is provided with a screw-thread 29 for the connection of the liquid admission pipe or hose.

The pocket 4 is preferably made of rubber showing a high resistance to the beer while its composition is such that it cannot communicate thereto any flavour, said grade being known in the trade and obviously said pocket may be easily dismantled for its cleaning or its replacement.

Before beginning the casking (Fig. 3), air is compressed which air passes through the valve 13 between the rigid cask 1 and the pocket 4, while the valve 7 is held open to allow the air contained inside said pocket 4 to escape so that the latter may be completely compressed (Fig. 4).

After the beer feeding pipe has been mounted on the admission channel 28 of the cock body 14, the air in this pipe and cock is allowed to escape by opening same until the beer appears; said cock is then secured into the bung-hole 6 of the cask by screwing the nut 19 in a manner such that the rubber ring 17 may be compressed sufficiently to be fastened inside said bung-hole.

The opening of the valve 25 which produces at the same time the opening of the check valve 7 is executed when the pressure on the outside of the elastic pocket 4 has been established at a value at least equal to that of the beer; then the air being allowed to escape gradually from the outside of the pocket 4 through the agency of the valve 13, the beer enters said pocket (Fig. 5).

When there is no more air left between the cask and the pocket 4, the latter is in contact with the inner wall (Fig. 6) of the rigid receiver 1.

As soon as the cask is full, the cock is closed, which produces the closing of the valve 7 and then said cock is removed from the bung-hole 6.

The barrel filling means and therewith the drawbacks inherent thereto are done away with and the special cock is adapted directly to the beer loading pipe inside which is merely provided an air chamber adapted to prevent water hammer effects.

With a view to protecting the valve 7 and the bung-hole 6 against any damage during transportation and the like, the bung-hole 6 is partially tapped for receiving a protecting plug 29 (see Fig. 9), after removal, however for instance through a spray of water of the few drops of beer which may be carried by said valve.

The formation of froth during the casking is also entirely eliminated according to the present method by reason of the beer passing out of the cock being submitted to no fall, shock or depressuring. As a matter of fact, at the beginning of the casking, the recess in the pocket 4 being completely reduced to zero; it may be considered somewhat as if the end of the beer admitting pipe were gradually inflated through the pressure of the beer so as to form a receiver inside which said beer is to be kept.

For the dealing out of beer in the cafés, there is used a cock similar to that used for the casking but it should obviously be designed so as to fit on the existing pipe system.

For the output, the cock is placed on the bung-hole 6 from which the plug 29 has been previously removed and the cock is opened after establishing the required pressure on the pocket 4 (Fig. 7) through the valve 13. This pressure should be somewhat more than the pressure on the beer increased by the height to which the latter is to be brought.

It is thus no longer necessary to introduce into the beer a plunging tube which has generally been left lying about in the cellar nor to sink into the barrel a plug which is always infected. Even if the cask is emptied only after several days, the beer will always behave as if the cask were not broken in, as the pocket follows at every moment the volume of its liquid contents until completely exhausted.

When a cask is empty and the drawing off cock is removed the air does not enter inside the elastic pocket by reason of the pressure existing on the outside of said pocket. The protecting plug is screwed again into the bung-hole and the brewery may receive as a return an empty cask which has not been contaminated.

The invention has been described and illustrated by way of a mere indication and by no means as a limitation and obviously numerous modifications may be brought to its details, without widening its scope, chiefly by exerting the counter pressure inside the yielding receiver while the liquid under pressure is then introduced between said receiver and the rigid receiver.

What I claim is:

1. A method of filling a gas ladened liquid into an elastic pocket removably mounted in a gastight receptacle and around the edge of a cover for said receptacle, without the loss of foam and without exposing said liquid to contact with air wherein said pocket is normally maintained closed by a check valve in said cover inside said pocket, comprising: mounting said pocket in said receptacle, opening said check valve, applying fluid pressure between the inside of said receptacle and the outside of said pocket to collapse said pocket to force air out of said pocket through said open check valve, introducing said liquid through said valve into said pocket under a pressure maintained above that of said fluid outside of said pocket until said pocket fills the inside of said receptacle, permitting said fluid pressure to reduce as said pocket is filled, and closing said valve when said pocket is filled.

2. An air-tight container having a removable elastic pocket, comprising: An elliptical cover for said container having a port therein, an elliptical seat for said cover facing the inside of said container whereby said cover is held closed by pressure from the inside of said container, means to clamp the open end of said elastic pocket between said cover and said seat, check valve means to maintain said port in said cover normally closed, and means to regulate the fluid pressure between the inside of said container and the outside of said pocket during the filling of said pocket.

3. A system for filling and emptying a container for holding a gas-ladened liquid, comprising: a gastight container, an elastic pocket removably fixed in said container, a cover for said container having a port therein, a seat facing the inside of said container for said cover, means to clamp the opening of said pocket between the edge of said cover and said seat, whereby said cover is held closed and said pocket is held in place by pressure from inside said container, normally closed check valve means for said port, filling and emptying nozzle means removably connected in said port, said nozzle means comprising means to simultaneously open said check valve and said nozzle to communicate with the inside of said pocket, and valve means through which the fluid pressure in said pocket may be changed to collapse said pocket for emptying and before filling said pocket with said gas-ladened liquid.

4. A system for filling and emptying a receptacle containing an internal elastic pouch for a gas-ladened liquid, comprising: a receptacle having an elliptical cover for said receptacle, said cover having a first port therein and a seat facing the inside of said receptacle against which seat the mouth of said pouch may be clamped, a normally closed check valve located over the inner end of said first port and in said pouch, and a second valved port for fluids communicating with the space between the outside of said pouch and the inside of said receptacle; a removable nozzle means to connect to said first port in said cover through which said gas-ladened liquid passes to and from said pouch under pressure, said nozzle including valve means which simultaneously also operates said first port check valve to control the flow of said gas-ladened liquid; whereby a fluid pressure may be maintained through said second valved port in said space a relatively fixed amount less than the pressure of said liquid in said pouch when said pouch is being filled and whereby a fluid pressure in said space may be maintained a relatively fixed amount more than the pressure of said liquid in said pouch when said pouch is being emptied.

5. An arrangement for casking and dealing out beer and the like liquids under pressure comprising a rigid hollow cask body substantially open at one end, wherein said opening is elliptical and has an inwardly facing seat, an inner yielding receiver in said cask, a removable cover adapted to fit said elliptical opening, the edges of which cover are adapted to fluidtightly urge the edge of the yielding receiver against the edge of said elliptical opening, a bung-hole provided in said removable cover, a valve normally maintaining said bung-hole closed, a duct adapted to feed a liquid under pressure, a cock fitted at the end of said duct, means for securing said duct to the bung-hole, common means for controlling said cock and said bung-hole valve for adjusting the flow of liquid into and out of the inner receiver, and a further valve provided in a wall of the cask body for introducing a fluid between the cask body and the yielding receiver opposing the pressure inside said receiver.

6. An arrangement for casking and dealing out beer and the like liquids under pressure comprising a rigid hollow cask body substantially open at one end, wherein said opening is elliptical and has an inwardly facing seat, an inner yielding receiver in said cask, a removable cover adapted to fit in said elliptical opening, the edges of which cover are adapted to fluidtightly urge the edge of the yielding receiver against said seat at the edge of said elliptical opening, a port in said cover, a normally closed check valve over said port in said receiver, means for opening said valve and feeding liquid through said port to one side of the yielding receiver, and means for exerting an adjustable counter-pressure on the other side of said receiver.

7. An arrangement for casking and dealing out beer and the like liquids under pressure by means of casks provided with an inner yielding receiver comprising a rigid cask body with one of its heads having an elliptical aperture with an inwardly facing seat, and a removable cover for said aperture to which cover the yielding receiver is detachably connected, said cover having a bunghole, the cover being shaped to be introduced through said elliptical aperture so that the edge of the yielding receiver forms an autoclave fluidtight gasket against said seat when pressure is established in said cask, means being provided to maintain the removable cover in position until said pressure has been established.

8. An arrangement for casking and dealing out beer and the like liquids under pressure by means of casks provided with an inner yielding receiver comprising a rigid cask body with one of its heads having an elliptical aperture with an inwardly facing seat, a removable cover for said aperture to which cover the yielding receiver is detachably connected, said cover having a bunghole, the cover being shaped to be introduced through an elliptical aperture so that the edge of the yielding receiver forms an autoclave fluidtight gasket against said seat when pressure is established in said cask, means being provided to maintain the removable cover in position until said pressure has been established, a check valve to close said bung-hole, said valve being held against the flat inner surface of said cover by means of removable resilient strips so that said check valve opens inside said receiver by moving away from said inner surface.

9. An arrangement for casking and dealing out beer and the like liquids under pressure from a cask having a bung-hole, a check valve over the inner end of said bung-hole, resilient means maintaining said check valve normally closing said bung-hole, a cock for filling and emptying said cask removably fixed fluidtightly in said bung-hole, and means to open and close said cock at its end which (when in said bung-hole) is in direct contact with said check valve, whereby said check valve is opened and closed simultaneously with and by the operation of said cock means.

10. A receptacle having an elliptical opening with an inwardly facing seat, a removable elliptical cover to fit in said opening, an elastic bag adapted to fit inside said receptacle, said bag having a mouth adapted to fit around the outer edge of said cover, whereby said mouth of said bag forms a fluidtight gasket between said seat and the edge of said cover.

JEAN EMILE LUCIEN LEPERRE.

REFERENCES CITED

The following references are of record in the file of this patent:

UNITED STATES PATENTS

| Number | Name | Date |
| --- | --- | --- |
| 1,911,094 | Skoglund | May 23, 1933 |
| 2,177,032 | Baumgardner | Oct. 24, 1939 |
| 2,283,100 | Shores | May 12, 1942 |

FOREIGN PATENTS

| Number | Country | Date |
| --- | --- | --- |
| 479 | Great Britain | Feb. 22, 1862 |
| 2,096 | Great Britain | Aug. 4, 1865 |
| 3,905 | Great Britain | Sept. 8, 1881 |
| 310,852 | Great Britain | Aug. 1, 1930 |
| 205,609 | Germany | Jan. 11, 1909 |